United States Patent [19]

Galford

[11] Patent Number: 5,120,955
[45] Date of Patent: Jun. 9, 1992

[54] LOGGING METHOD AND APPARATUS FOR CORRECTING NATURAL GAMMA RAY MEASUREMENTS FOR BOREHOLE FLUID EFFECTS BY CALCULATING A BOREHOLE CORRECTION FACTOR AND APPLYING THE CORRECTION FACTOR TO CALCULATED ELEMENTAL YIELDS

[75] Inventor: James E. Galford, Sugar Land, Tex.

[73] Assignee: Schlumberger Technology Corporation, Houston, Tex.

[21] Appl. No.: 711,476

[22] Filed: Jun. 6, 1991

[51] Int. Cl.⁵ ............................................. G01V 5/06
[52] U.S. Cl. ..................................... 250/256; 250/262
[58] Field of Search ................................ 250/262, 256

[56] References Cited

U.S. PATENT DOCUMENTS

| | | | |
|---|---|---|---|
| 3,521,064 | 7/1970 | Moran et al. | 250/261 |
| 3,858,037 | 12/1974 | Moore et al. | 364/422 |
| 3,900,733 | 8/1975 | Seeman | 250/262 |
| 3,976,878 | 8/1976 | Chevalier et al. | 250/253 |
| 4,096,385 | 6/1978 | Marett | 250/262 |
| 4,394,574 | 7/1983 | Grau et al. | 250/262 |
| 4,542,292 | 9/1985 | Ellis | 250/256 |
| 4,568,829 | 2/1986 | Ruckebusch | 250/256 |
| 4,825,071 | 4/1989 | Gadeken et al. | 250/256 |
| 5,023,449 | 6/1991 | Holenka et al. | 250/252.1 |

OTHER PUBLICATIONS

Cox, J. W. et al., "The Effect of Potassium-Salt Muds on Gamma Ray and Spontaneous Potential Measurement," *Proc. SPWLA 17th Annual Logging Symposium Transactions,* Denver, Colorado, Jun. 9-12, 1976.

"Shaly Sand Evaluation Using Gamma Ray Spectrometry, Applied to the North Sea Jurassic", Marrett, G. et al., *Proc. SPWLA 17th Annual Logging Symposium, (Jun. 9-12, 1976), pp. 1-21.*

"Theory, Interpretation and Practical Applications of Natural Gamma Ray Spectroscopy", Serra, O. et al., *Proc. SPWLA 21st Annual Logging Symposium,* (Jul. 8-11, 1980), pp. 1-30.

"Computer Determination of Calibration and Environmental Corrections for a Natural Spectral Gamma Ray Logging System", C. J. Koizumi, *SPE Formation Evaluation,* pp. 637-644, (Sep. 1988).

"Applications of the Compensated Spectral Natural Gamma Ray Tool," Gadeken, L. L. et al., *SPWLA 25th Annual Logging Symposium,* (Jun. 10-13, 1984), paper JJ.

"A Multi-Function Compensated Spectral Natural Gamma Ray Logging System," Smith, H. D. et al., *SPE 12050,* (Oct. 5-8, 1983).

"Correction of NGT Logs for the Presence of KCl and Barite Muds," Ellis, D. V., *SPWLA 23rd Annual Logging Symposium,* vol. 1, (Jul. 6-9, 1982).

*Primary Examiner*—Constantine Hannaher
*Attorney, Agent, or Firm*—Henry N. Garrana; John H. Bouchard

[57] ABSTRACT

A method and apparatus for determining the presence of at least one naturally radioactive element in an earth formation surrounding a borehole, wherein, for each depth in the borehole, a spectrum is made of the gamma rays detected in several energy channels, and expressed as $U = S Y$, where "Y" is the elemental yields and "S" is a composite spectra matrix made of individual standard spectra characteristic of a given borehole environment; yields Y are then calculated. One thus determines a borehole correction factor from the general relationship between the borehole parameters, the standard spectra and the measured spectra. Finally, the yields are corrected for borehole effects by applying the correction factor.

The correction factor is energy independent, at least for energies above a given threshold, and is also independent from the radioactive elements.

32 Claims, 4 Drawing Sheets

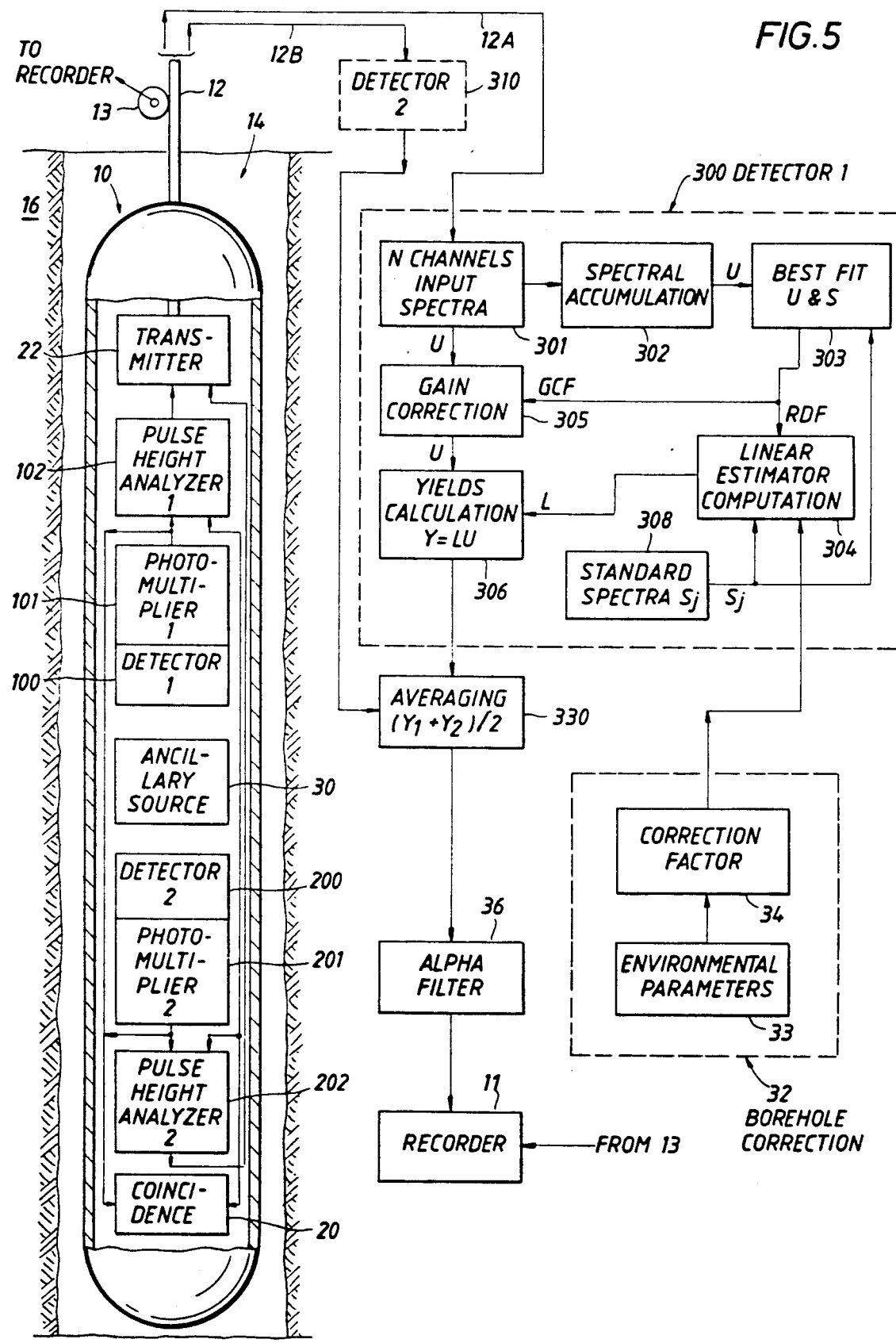

LOGGING METHOD AND APPARATUS FOR CORRECTING NATURAL GAMMA RAY MEASUREMENTS FOR BOREHOLE FLUID EFFECTS BY CALCULATING A BOREHOLE CORRECTION FACTOR AND APPLYING THE CORRECTION FACTOR TO CALCULATED ELEMENTAL YIELDS

BACKGROUND OF THE INVENTION

1. Field of the Invention

The invention is in the field of well logging, in which measurements taken in a borehole are used in searching for and exploiting valuable underground resources such as oil and gas. It is particularly directed to a method and a system for natural gamma radiation logging, in which a log is derived of the radiation detected in selected energy windows and is converted into a log of selected subsurface materials, such as thorium, uranium and potassium. Yet more specifically, the invention is directed to deriving a log of the selected subsurface materials which is substantially corrected for errors due to factors such as radiation emitting materials (e.g. potassium, in the form of potassium chloride) in the borehole fluid, and radiation absorbing materials, such as barite and/or hematite, in the mud filtrate.

2. The Prior Art

In prior art natural gamma radiation logging, a tool capable of detecting gamma radiation in each respective one of several energy windows is passed through a selected borehole interval, and a record is made of the gamma rays detected within the respective windows. The gamma rays are emitted in the decay of subsurface materials such as thorium, uranium and potassium (Th, U, K), each of which emits a characteristic spectrum resulting from the emission of one or more gamma ray at various energies. The tool output is converted to a log of the concentrations of Th, U, K at the respective borehole depth levels.

The Th, U, K log is important in searching for and exploiting underground resources because it is believed that these materials appear in nature with a discernible relationship to geology and rock morphology. The log is particularly useful in the exploration for and exploitation of oil and gas resources because it is believed that the concentrations of Th, U, K taken individually or in combination are a good indication of previously unavailable information as to the presence, type and volume of shale or clay in the formations surrounding the borehole.

In practice, the nature of the logging process makes the detected spectra continuous, with poor energy resolution and poor counting statistics. Nevertheless, there are known techniques for usefully estimating and logging the Th, U, K concentrations.

The difficult measurement conditions in Th, U, K logging have been made yet more difficult by the common use of borehole fluids (drilling mud) containing potassium chloride (KCl) and weighting materials which are strong absorbers of gamma rays, such as barite and/or hematite (hereafter B). These borehole fluids stabilize the borehole by reducing clay and shale hydration and provide various other benefits. However, the KCl in the borehole fluid emits its own gamma radiation whose contribution is merged with that of potassium in the undisturbed formations surrounding the borehole, while the strong absorber B in the same borehole fluid can significantly reduce the gamma radiation flux from the surrounding formations. Typically, the drilling and logging environment makes it impossible or impractical to measure the concentration of KCl and B in the mud at the time the borehole logging commences.

Also, it is known that barite in the mud has a significant effect in nuclear (scattered gamma radiation) logging. See Seeman U.S. Pat. No. 3,900,733 and references cited therein, for a discussion of techniques attempting to correct for the barite effect. It is also known that KCl in the mud filtrate has a significant effect in natural gamma radiation logging. See Cox, J. W. et al, "The Effect Of Potassium-Salt Muds On Gamma-Ray, And Spontaneous Potential Measurements," SPWLA 1976, and references cited therein. Additional uncertainties are introduced by the fact that relatively few gamma rays can be detected in the respective energy windows at a given borehole depth because the tool must move through the borehole at a sufficiently high speed to allow drilling or production activities to resume as soon as possible, and by the fact that the tool response changes as a function of borehole size.

Some aspects of known gamma radiation well logging are discussed in Marrett, G. et al, "Shaly Sand Evaluation Using Gamma Ray Spectrometry, Applied to the North Sea Jurassic," Proc. SPWLA 17th Annual Logging Symposium, Jun. 9-12, 1976, and Serra, O. et al, "Theory, Interpretation and Practical Applications of Natural Gamma Ray Spectroscopy," Proc. SPWLA 21st Annual Logging Symposium, Jul. 8-11, 1980, and additional information can be found in Chevalier et al., U.S. Pat. No. 3,976,878 and Moran et al U.S. Pat. No. 3,521,064. As discussed in the above cited documents, all of which are incorporated by reference herein, it is possible to convert the output of a natural gamma radiation logging tool having several (e.g. five) energy windows into a log of thorium, uranium and potassium concentrations (Th, U, K), in essence by subjecting the tool output to a filter characterized by a $3 \times 3$ or $3 \times 5$ matrix which can be empirically derived-such as by passing the tool through a test borehole containing known concentrations of Th, U, K arranged to approximate the effect of homogeneous beds of infinite depth and radial extent and recording the windows responses. If W designates the radiation detected in five energy windows at a given borehole depth level i.e., $U = [U_1, U_2, U_3, U_4, U_5]$, and X designates the thorium, uranium and potassium concentrations at the same depth level, i.e., $Y = [Th, U, K]$, then the relationship between the windows measurements U and the concentrations Y (when no environmental effects are present) can be described by:

$$U = SY + E \qquad (1)$$

where S is defined by a $5 \times 3$ tool sensitivity matrix which is unique to a given tool and can be empirically derived by passing the tool through a borehole containing known concentrations of Th, U, K in idealized beds, and $E = [e_1, \ldots, e_5]$ denotes the statistical errors which are due to the Poisson nature of gamma ray detection, What is of interest normally is the concentrations of Th, U, K as a function of the radiation detected in the windows, and therefore what is of interest is the relationship:

$$Y = MU \qquad (2)$$

where M is defined as a 3×5 matrix relating the concentrations of the three materials to the radiation detected in the five energy windows at a given depth level in the borehole. M can be found through a least squares technique relating known concentrations Th, U, K to measured radiation in the five energy windows for given test conditions. The matrix M need be found only once for a given logging tool.

In the known technique, a log of the Th, U, K concentrations is derived by evaluating the relationship (2) at each depth level in the borehole. Additional aspects of borehole effects correction are discussed in Ellis, D., "Correction of NGT Logs for the Presence of KCl and barite Muds", Proc. SPWLA 23rd Annual Conference, Jul. 6–8, 1982 (NGT is a trademark of Schlumberger). As discussed in that document, which is incorporated by reference herein, the gamma radiation emitting subsurface materials logs may be corrected for at least one of: (i) the gamma ray emitter potassium chloride (KCl) in the borehole fluid, and (ii) a gamma ray attenuator (absorber) in the borehole fluid, e.g. barite and/or hematite.

It has also been proposed in U.S. Pat. No. 4,568,829 a method for improving the log of Th, U, K concentrations based on the recognition that the concentrations log can be filtered not in a fixed manner but adaptively, in accordance with changes with borehole depth in the detected radiation and an understanding of the nature of the logging process. In particular, the Th, U, K concentrations estimate for a previous depth level by an amount determined through applying a filter (constructed for the given depth level) to a combination of: (i) the radiation detected in the five energy windows for the given depth level and (ii) an estimate for the radiation in the five energy windows derived by applying the tool sensitivity matrix to the concentrations estimate for the previous depth level.

U.S. Pat. No. 4,542,292 describes a method wherein is derived a log of gamma radiation detected in selected energy windows, e.g. five, for a selected borehole interval, and converting it into a log of the selected materials, e.g. Th, U, K, which is substantially corrected for at least one of: (i) a gamma ray emitter in the borehole fluid, e.g. potassium salts and (ii) a gamma ray attenuator in the borehole fluid, e.g. a strong attenuator such as barite and/or hematite. In a particular embodiment, the concentrations of the three materials (Th, U, K) are related through an empirically derived logging tool sensitivity matrix to five corrected window measurements. The known method in the '292 patent is based on assumptions which alter its reliability. First, the KCl concentrations and B corrections found as described above for the individual depth levels in the borehole typically differ significantly from one depth level to another. The only way to overcome this difficulty is to assume that the KCl is typically well mixed in the borehole fluid, and that its concentration should be reasonably constant throughout the well. In the case of the strong absorber, its effective absorption is mainly related to the diameter of the borehole and could be significantly perturbed by variable mudcake build-up.

The above depicted prior art show detrimental drawbacks. One correction factor has to be applied to each of the respective energy windows (or channels). Furthermore, the correction factor differs from one radioactive element to the other. Accordingly, the calculation and computation steps are time consuming and therefore limit the ability of the system to compute and display the data in real time. The real time ability could be improved by decreasing the logging speed, but at the cost of increasing the duration of the logging run, which is not desirable businesswise. Another constraint complicates further the situation, that is a phenomenon called "statistics" which alters the detection; the higher the logging speed, the bigger the statistics effects.

Consequently, there is a need for an improved method of correction for borehole effects on natural gamma ray logs.

OBJECT OF THE INVENTION

It is a principal object of the invention to provide a method and apparatus for correcting for borehole effects in logging natural gamma ray measurements, which is efficient and fast, thus allowing real time calculation and high logging speeds without sacrificing reliability or accuracy.

SUMMARY OF THE INVENTION

The foregoing and other objects are attained in accordance with the invention by a method for determining the presence of at least one naturally radioactive element in an earth formation surrounding a borehole, comprising the steps of:

(1) detecting, at each depth in the borehole, the gamma rays emitted by the naturally radioactive element(s);
(2) establishing, for each depth in the borehole, a spectrum (counts versus energy) of the gamma rays detected in a plurality of energy channels;
(3) expressing, for each depth, the measured spectrum "U":

$$U = S Y$$

where "Y" is a vector whose components are the elemental yields and "S" is a composite spectra matrix made of individual standard spectra characteristic of a given borehole environment;
(4) calculating a borehole correction factor from the general relationship between the borehole parameters, the individual standard spectra and the measured spectra; the correction factor being energy independent;
(5) calculating borehole corrected standard spectra characteristic of the actual borehole environment by applying to the standard spectra the correction factor; and
(6) calculating the elemental yields.

In a preferred embodiment, the correction factor is the same for all the energy channels above a given threshold, e.g. 0.5 Mev.

Also, the correction factor is the same for all the radioactive elements. In other words, in the case where matrix S comprises three standard spectra for three respective elements (e.g. Th, U, K), the correction factor can be applied uniformly to all three standard spectra.

According to a second aspect of the invention, it is proposed a method for determining the presence of at least one naturally radioactive element in an earth formation surrounding a borehole, comprising the steps of:
(1) detecting, at each depth in the borehole, the gamma rays emitted by the naturally radioactive element(s);
(2) establishing, for each depth in the borehole, a spectrum (counts versus energy) of the gamma rays detected in a plurality of energy channels;

(3) expressing, for each depth, the measured spectrum "U" in matrix form:

$$U = S Y$$

where "Y" expresses the elemental yields and "S" is a composite spectra matrix made of individual standard spectra characteristic of a given borehole environment;

(4) calculating from the measured spectra the elemental yields;

(5) calculating a borehole correction factor from the general relationship between the borehole parameters, the standard spectra and the measured spectra; and (6) calculating borehole corrected yields by applying to the calculated yields the correction factor.

The method comprises moving in the borehole a sonde comprising at least one and preferably two gamma ray detectors. In a preferred embodiment, the detector comprises bismuth germanate crystal, e.g. of the formula $Bi_4Ge_3O_{12}$ (hereafter BGO).

The correction factor "F" may be of the form:

$$F = ae^{-bx} + c$$

where a, b and c are coefficients determined through a calibration process and "x" is a function of geometrical and physical parameters of the borehole.

By way of example:

$$X = \tfrac{1}{2}(\phi_B - \phi_S)\rho_e$$

where $\phi_B$ is the borehole diameter, $\phi_S$ the sonde diameter and $\rho_e$ is the density of electrons in the borehole fluid.

According to this second aspect of the invention, the correction factor is preferably energy independent, i.e. the correction factor is the same from one energy channel to the other, at least for most part of the energy spectra. Also, the correction factor is independent from the radioactive element.

The invention also embraces an apparatus for determining the presence of at least one naturally radioactive element in an earth formation surrounding a borehole, comprising:

(1) means for detecting, at each depth in the borehole, the gamma rays emitted by the naturally radioactive element(s);

(2) means for establishing, for each depth in the borehole, a spectrum (counts versus energy) of the gamma rays detected in a plurality of energy channels;

(3) means for establishing, for each depth, the measured spectrum "U" in matrix form:

$$U = S Y$$

where "Y" is a vector whose components are the elemental yields and "S" is a composite spectra matrix made of individual standard spectra characteristic of a given borehole environment;

(4) means for calculating a borehole correction factor from the general relationship between the borehole parameters, the individual standard spectra and the measured spectra; the correction factor being energy independent;

(5) means for calculating borehole corrected standard spectra characteristic of the actual borehole environment by applying to the standard spectra the correction factor; and (6) means for calculating the elemental yields.

According to another aspect, the invention also deals with an apparatus for determining the presence of at least one naturally radioactive element in an earth formation surrounding a borehole, comprising:

(1) means for detecting, at each depth in the borehole, the gamma rays emitted by the naturally radioactive element(s);

(2) means for establishing, for each depth in the borehole, a spectrum (counts versus energy) of the gamma rays detected in a plurality of energy channels;

(3) means for expressing, for each depth, the measured spectrum "U":

$$U = S Y$$

where "Y" expresses the elemental yields and "S" is a composite spectra matrix made of individual standard spectra characteristic of a given borehole environment;

(4) means for calculating from the measured spectra the elemental yields;

(5) means for calculating a borehole correction factor from the general relationship between the borehole parameters, the standard spectra and the measured spectra; and (6) means for calculating borehole corrected yields by applying to the calculated yields the correction factor.

The characteristics and advantages of the invention will appear better from the description to follow, given by way of a non limiting example, with reference to the appended drawing in which:

BRIEF DESCRIPTION OF THE DRAWINGS

FIG. 5 is an alternate embodiment of the invention.

DESCRIPTION OF THE PREFERRED EMBODIMENT

Although the invention will be described in connection with naturally radioactive elements present in the lithology composition of earth formation, it could also be applied to the detection of radioactive tracers injected in the formation.

Figures 1, 2:
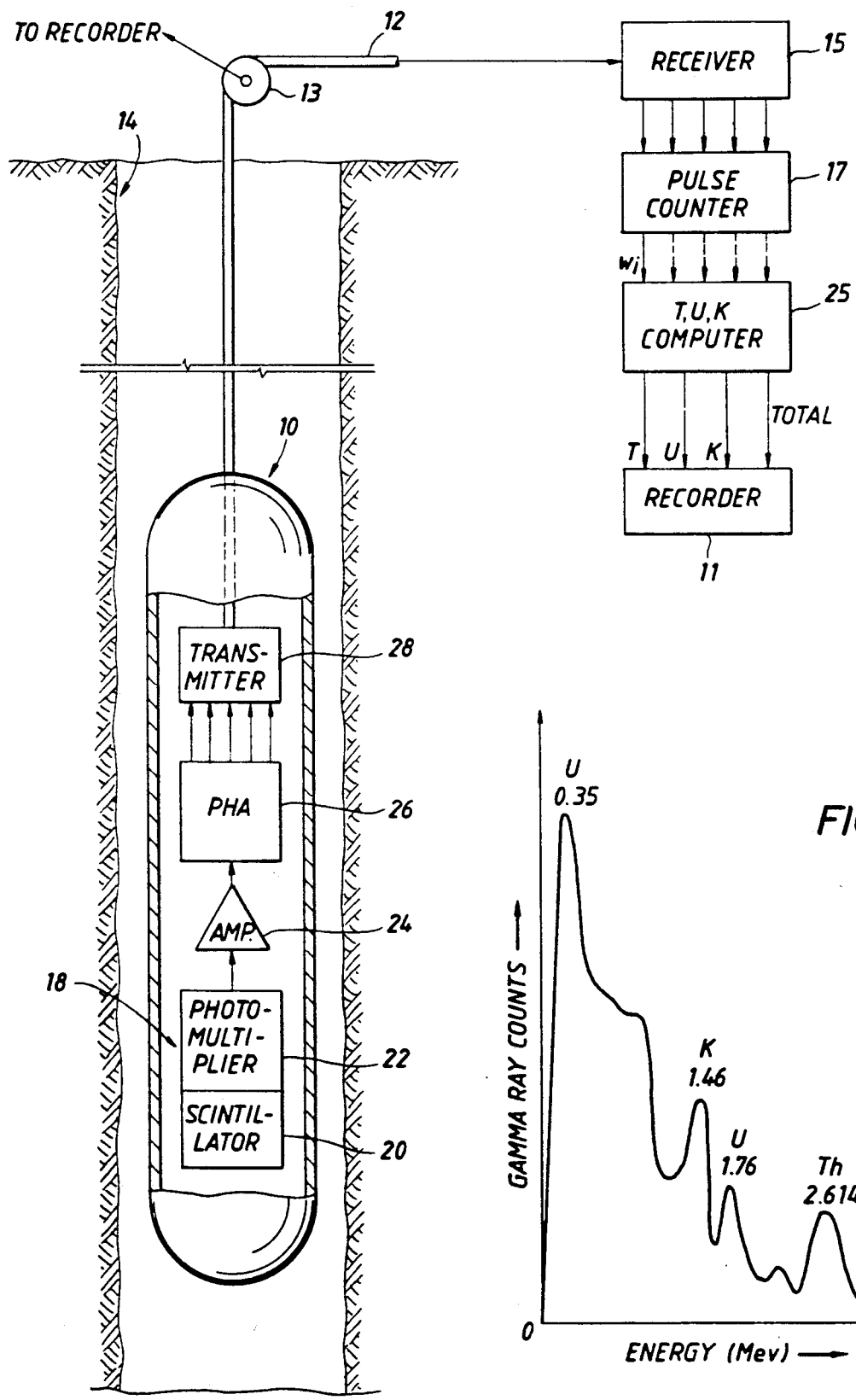
FIG. 1 is a schematic view of a logging tool suspended in a well to which the invention can be applied.
FIG. 2 is a graphical representation of a typical gamma ray spectrum from an earth formation comprising naturally radioactive elements.

Referring to FIG. 1, a logging sonde 10 is shown suspended by an armored cable 12 in a borehole 14 surrounded by earth formations 16. A depth measuring device 13, disposed close to the surface, is associated in the usual manner to the cable 12 and to a surface recorder 11. The nuclear measurements carried out in the sonde, as a function of depth, are transmitted along the cable 12 towards the surface recorder 11, successively via a receiver 15, and a pulse counter 17. The pulse counter 17 is connected to a T,U,K computer 25 itself connected to recorder 11. The pulse counter 17 and computer 25 will be further described.

Within the sonde 10, a gamma ray detector 18, that includes a scintillator crystal 20 and a photomultiplier 22, responds to the natural radioactivity of the adjacent formation. Other radiation detectors, such as a solid-state germanium detector or a bismuth germanate crystal, e.g. of the formula $Bi_4Ge_3O_{12}$ (hereafter BGO) detector, also may be used. The output of the photomultiplier 22, after amplification by amplifier 24, is applied to a multichannel pulse height analyzer 26 (PHA) which divides the amplitude spectrum of the photomultiplier output pulses into a plurality of contiguous windows (or channels). FIG. 2 shows a typical natural gamma ray spectrum from a formation of interest, comprising energy peaks characteristic of respective naturally radioactive elements, such as uranium (U) at 0.35 Mev and 1.76 Mev, potassium (K) at 1.46 Mev and thorium (Th) at 2.614 Mev. The spectrum is divided in several "m" energy windows, preferably of equal width. For example, in accordance with the teaching of U.S. Pat. No. 3,976,878 to Chevalier et al. or U.S. Pat. No. 4,096,385 to Marett, which are both incorporated herein by reference, the number of windows m=5. The photomultiplier output pulses falling respectively within the selected energy windows are produced on the outputs of PHA 26. The output pulses from PHA 26 are transmitted over conductors in cable 12 to the receiver 15 at the surface. The receiver 15 transmit pulses of the PHA outputs to pulse counter 17 which generates outputs representing, for each selected level or depth in the borehole, the counting rates "$w_i$", i=1, . . . m, of the detected gamma rays falling within the "m" energy windows respectively. The counting rates $w_i$ are applied to the computer 25 which is programmed to compute, for each level of interest, the proportions of the radioactive components T,U,K, by solving the following equations:

$T = \Sigma a_{Ti} w_i$ $U = \Sigma a_{Ui} w_i$ $K = \Sigma a_{Ki} w_i$ where i=1, . . . , m and $a_{Ti}$, $a_{Ui}$, $a_{Ki}$ are weighting coefficients which have been determined from measurements in calibration blocks containing known amounts of thorium, uranium and potassium. Computer 25 produces one signal for each element, i.e. three signals, representative of the computed TUK content, expressed in ppm or percentage. Computer 25 may also generate a fourth signal representative of the total natural gamma ray radioactivity, expressed usually in API units, and any other appropriate signal related to the T, U and K content. Those signals are applied to recorder 11, which is linked to depth measuring device 13.

Figure 3:
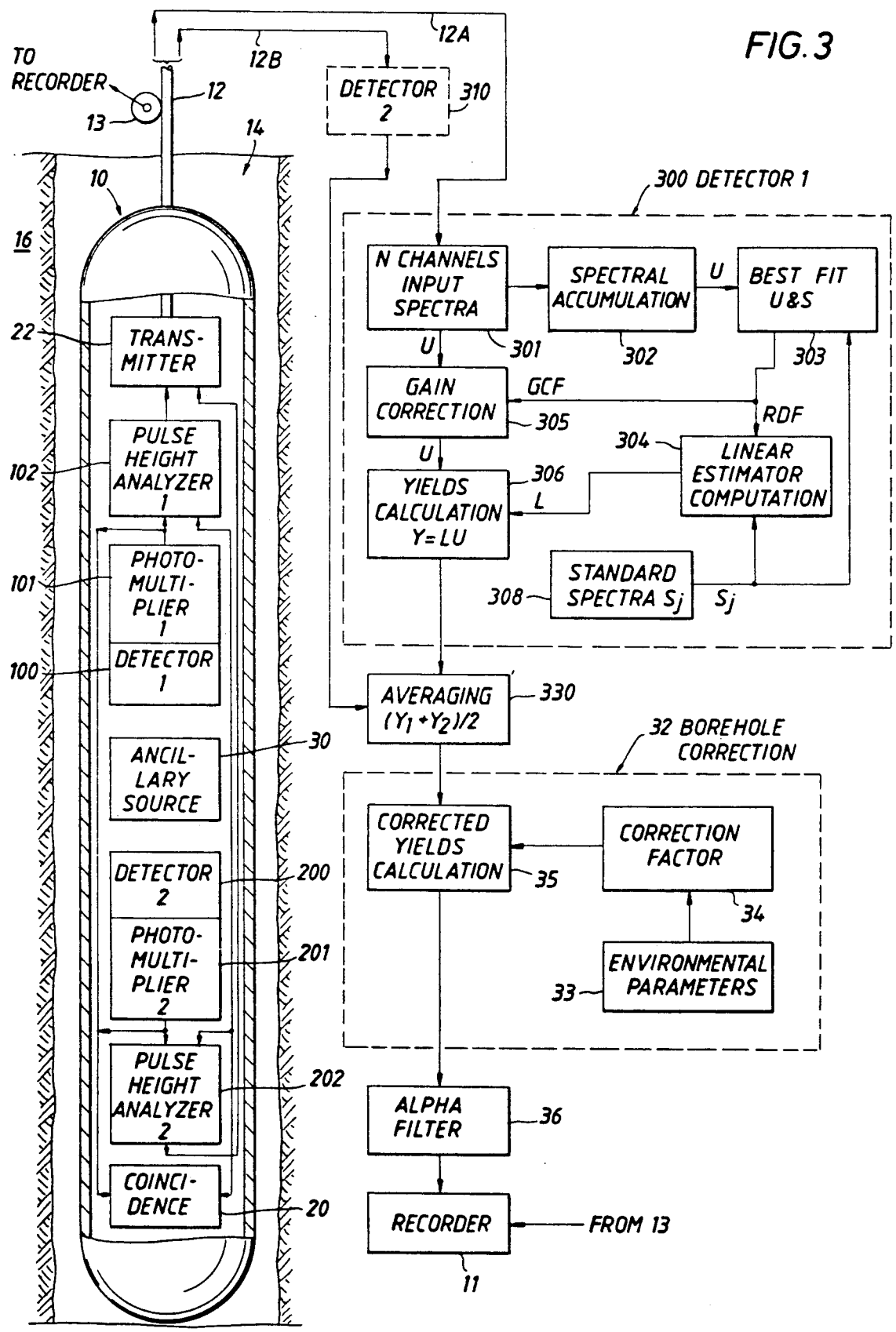
FIG. 3 shows a schematic view of an example of implementation of a logging tool incorporating the invention.

FIG. 3 shows a preferred embodiment of a gamma ray logging tool including the invention, directed at generating the Th, U, K content of the formation corrected for the effects of the borehole. Elements on FIG. 3 similar to elements on FIG. 1 bear the same reference.

Within the sonde 10 are provided downhole devices, including a first nuclear detector 100 associated to a first photomultiplier 101, which output feeds a first pulse height analyzer 102 linked to a transmitter 22 allowing transmission of data through cable 12. The downhole devices, inside the sonde 10, also comprise a second nuclear detector 200 associated to a second photomultiplier 201 feeding a second pulse height analyzer 202 itself also linked to the transmitter 22. The outputs of the respective photomultipliers 101, 201 are connected to a coincidence circuit 20, itself linked to additional inputs respectively provided in the first and second pulse height analyzers 102, 202. Between the detectors 100 and 200 is disposed an ancillary nuclear source 30, e.g. a $^{22}Na$ source. The two detectors 100 and 200 are scintillation crystal detectors, and more particularly include BGO crystal, e.g. of the formula $Bi_4Ge_3O_{12}$. By way of non limiting example, the BGO detectors 100 and 200 are of cylindrical shape of 5 to 10 inches (12.5 to 26 centimeters) length in the longitudinal direction, and of 1 to 4 inches (2.5 to 10 centimeters) diameter (in the transverse direction). More details about the general arrangement of the sonde can be found in U.S. Pat. No. 5,023,449 issued to Holenka and Sloan, assigned to the assignee of the present application and incorporated herein by the reference.

The cable 12 comprises a first link 12A and a second link 12B respectively related to detector 1 and detector 2 and respectively connected to block 300 and block 310. Blocks 300 and 310 are essentially similar and contain similar elements, although block 310 has been represented as an empty box for the sake of clarity.

The following description refers to the processing of data issued from one detector, bearing in mind the same steps are carried out for the data issued from the other detector.

The measured spectrum obtained with the PHA 102, is recorded as a histogram, in circuit 301. The abscissa is the energy axis which is divided into "m" individual energy intervals or channels; for example, m=254. The "m" energy channels may be of equal width. The ordinate for the $i^{th}$ energy interval is the number (or counts) of gamma-rays accumulated for that energy interval. Data from circuit 301 are input in spectral accumulation circuit 302 which generates spectra resulting from the accumulation, over a period of time, e.g. several minutes, of gamma ray counts sorted by energy. Such period of time is chosen to be relatively long compared to the nuclear phenomenon involved; typically it is of about five minutes. Circuit 302 then issues, every five minutes, an accumulated spectrum. In the following discussion, each of the measured spectra are represented as a m-length vector "U". In general, a formation spectrum as measured can be described as a linear combination of a complete set of "n" individual standard descriptor spectra, $S_j$ (j=1, 2, . . . , n). Each of these individual standard spectra may correspond to a postulated element. i.e. an element expected to be present in the formation. Thus, "n" is the number of elements postulated to constitute the formation under investigation. In natural gamma ray logging, those elements comprises mainly uranium, thorium and potassium. To generate the set of standard spectra $S_j$, for use in the standard matrix S, standard natural spectra are taken in special laboratory formations designed to emphasize the spectral contribution of each postulated element. The vectors for the standard spectra are mathematically represented by column vectors of an "m×n" composite spectra matrix "S", such that $$U^n = \sum_{j=1}^{n} S_j^n Y_j \qquad (4)$$

where "Y" is a vector whose components are the elemental yields $Y_j$ (to be determined) each of which represents the fractional contribution from the corresponding composite spectrum vector, $S_j$, to the measured spectrum U. The most significant spectral-response functions required for the natural spectra are usually for elements U, K and Th. Standard spectra $S_j$ are stored in memory 308. Other standard spectra may be stored in 308, such as standard spectrum corresponding to the detector background, in order to take into account the gamma rays emitted by some naturally radioactive element present in the detector itself, such as Bi in case of a BGO detector.

The general problem of spectroscopy-logging analysis is to determine the contribution of each element to the measured spectrum represented by the elemental yields "Y".

Block 303 called "best fit U & S" receives the measured spectra U (issued from spectral accumulation circuit 303) and receives also the standard spectra $S_j$. In block 303, spectra U and S are processed in view of determining the best fit between the measured spectra U and a given combination of the standards spectra $S_j$. The best fit is searched using mathematical methods which determine the minimal difference between the two spectra to match. In a preferred embodiment, the best fit is determined through a non-linear least squares method, such as Marquardt's method, a grid search, or a gradient search. A detailed example of implementation of Marquardt's method is described in the U.S. patent application filed on Aug. 7, 1990, Ser. No. 07/564,251, in the name of B. Roscoe and C. Stoller, assigned to the assignee of the present application, and which is herein incorporated by reference. General information, from the mathematical standpoint, on this kind of method, known per se, can be found in the book "Data Reduction and Error Analysis for the Physical Sciences" from P. R. Bevington, editor MacGraw-Hill Book company, 1969, which is herein incorporated by reference.

In order to determine the best fit between the composite spectra matrix "S" and the measured spectra "U", it is necessary to match the parameters representative of the conditions under which the respective measured spectra and composite spectra matrix have been obtained. A first parameter is the resolution degradation factor (hereafter referred to as RDF) which is representative of the effects of the variation from one detector to the other, or of the effects due to the processing electronics downstream from the detector, or finally of the temperature. A second parameter is the gain (hereafter GCF) which is characteristic of the electronic components used to obtain both measured spectra and composite spectra matrix. This list of parameters is given for illustrative purpose and is not exhaustive. The best fit in ciruit 303 is determined through minimizing a given function of both measured U and composite spectra matrix S while modifying the elemental yields Y and the above mentioned parameters. By way of example, one minimizes $\chi^2$, i.e. the weighted sum of the squares of the deviation of the fitting function (composite spectra matrix) and the measured function (measured spectrum). The minimum condition for $\chi^2$ can be formulated as:

$$\chi^2 = \sum_i \frac{\left( \sum_j y_j S_j^i(\alpha) - - U^n \right)^2}{V^i} = \min. \qquad (5)$$

where "$\alpha$" represents the change in gain and RDF to be applied to the composite spectra matrix so these parameters match those of the measured spectrum; and "$V^i$" is the variance spectrum which can be expressed as: $V^i = 1/W^i$, with $W^i$ expressing the Poisson statistics of the measurements.

Block 303 issues parameter GCF which is input in a gain correction circuit 305 receiving the measured spectra U from the input spectra circuit 301. The correction circuit 305 adjusts the energy scale of the measured spectra and issues measured spectra which are corrected for gain. Also, the best fit circuit 303 delivers parameter RDF which is entered in a linear estimator computation circuit 304, which is itself connected to the memory 308 which are stored the standard spectra $S_j$. Both circuit 304 and gain correction circuit 305 aim at correcting the measured spectra for respective systematic effects, i.e. gain and detector resolution.

The linear estimator computation circuit 304 will now be described.

Since the standard spectra S, in the form of a "m×n" matrix, is not square because the number of energy channels "m" is usually greater than the number of elements "n", it is not possible in general to invert S in order to solve U=S Y (equation 4) for Y. Also, the measured spectrum U contains statistical errors which can be represented by including an error spectrum, E, in equation 4.

$$U = S Y + E \qquad (6)$$

By selecting a suitable positive symmetric weighting matrix, W, the weighted statistical error squared (i.e. $\chi^2$) is:

$$\chi^2 = E^T W E = (U - S Y)^T W (U - S Y) \qquad (7)$$

where $E^T$ is the transpose of E, and $E^T W E$ is representative of the overall weighted error. The weighted-least-squares solution, which minimizes the error in equation 6 is given by:

$$Y = (S^T W S)^{-1} S^T W U \qquad (8)$$

The choice of the weighting matrix W determines the nature of the least-squares estimate.

Equation 8 can be rewritten in the form $$Y = L U \qquad (9)$$

where $$L = (S^T W S)^{-1} S^T W \qquad (10)$$

The matrix "L" consists of "n" row vectors, "$L_j$", each associated with one of the individual standard $S_j$. The vectors, $L_j$, are called linear estimators because the scalar product between the measured spectrum U and each of the vectors, $L_j$, gives the fractional contribution or yield $Y_j$, of the $j^{th}$ element to the measured spectrum.

As discussed above, each individual standard spectrum leads to the generation of an associated linear estimator $L_j$ whose shape reflects the character of the standard and the cross correlations between it and other standards. Thus, the estimator is a type of digital filter that extracts from the measured spectrum U the contribution from its associated composite spectra matrix. The estimators, include both positive and negative components. The positive and negative components occur where a standard correlates with one or more other standards. More details about the above steps can be found in U.S. patent application filed on Nov. 13, 1990, Ser. No. 07/612,345 under the name of B. Roscoe and M. Evans, assigned to the assignee of the present application, and herein incorporated by reference.

Linear estimator computation circuit 304 comprises a convolution filter, as depicted in U.S. Pat. No. 4,934,574 to Grau and Hertzog, assigned to the assignee of the present invention. The convolution filter causes the elemental standard specta to be degraded in a manner which takes into account the effects of temperature on the detector resolution. The degraded standard spectra are next utilized to generate an equal number of linear estimators L. The latter are input in a yields calculation circuit 306 also receiving the measured spectra corrected for gain. The calculation of the yields Y is carried out in accordance with equation Y=L U. The calculation of Y is based on a least squares method, as e.g. described in U.S. patent application Ser. No. 07/612,345 of B. Roscoe and M. Evans or in patent application Ser. No. 07/564,251 of B. Roscoe and C. Stoller, both already referred to.

The outputs of the respective blocks 300 and 310 are then merged in averaging circuit 330 which delivers a combination, e.g. through averaging, of the yields coming from the respective detectors.

The elemental yields obtained are then corrected for borehole effects as it will be hereafter described. It has to be noted that according to one important feature of the invention, the borehole correction is carried out directly on the yields, contrary to the prior art wherein the borehole correction is made during the intermediate computation leading finally to the yields calculation. As already pointed out, this is very beneficial since it allows a substantial reduction in computation time and correlatively improved statistics for a given logging speed.

The elemental yields "Y", as calculated in circuit 306, are corrected (see box 32 on FIG. 3) according to:

$$Y_{cor} = Y F \quad (11)$$

where $Y_{cor}$ are the corrected yields and "F" is a correction factor which is a function of the disturbing effects (scattering and absorption) of the borehole.

F is e.g. of the form:

$$F = a e^{-bx} + c \quad (12)$$

where "x" is a function representative of the amount and physical characteristics of the borehole fluid between the detector and the formation; and "a", "b" and "c" are coefficients determined experimentally in calibration facilities, by testing a given tool in test boreholes having known diameters.

For example:

$$x = \tfrac{1}{2}(\phi_b - \phi_t)\rho_e \quad (13)$$

where $\phi_b$ and $\phi_t$ are the respective diameter of the borehole and the tool, and $\rho_e$ is the electron density in the borehole fluid; $\phi_b$, $\phi_t$ and $\rho_e$ are environmental parameters stored in memory 33 (which also contain coefficients a, b and c of equation 12 and which are input in circuit 34 for the calculation of the correction factor F, according to equation 12. $\rho_e$ may be determined according to the following formula:

$$\rho_e = a' + b' m \quad (14)$$

where "m" is the borehole fluid density and a' and b' are coefficients determined in laboratory conditions. Thus, for a given kind of borehole fluid, $\rho_e$ is calculated once and for all and stored in memory 33.

The elemental yields, corrected for borehole effects, are then calculated in circuit 35, according to:

$$Y_{cor} = Y F \quad (15)$$

where $Y_{cor}$ are the final corrected yields and Y are the combined yields issued from averaging circuit 330.

In the best mode, the correction factor "F" is independent from the energy; in other words, the correction factor is the same for each of the energy channels. This is true for most part of the spectrum. F is the same for each energy channel above a given threshold. Such threshold can be e.g. around 0.5 Mev. Furthermore, the correction factor F does not depend on the naturally radioactive element; in other words, F is the same for all the elements, i.e. uranium, thorium and potassium.

It is of importance to note that the system of the invention shown on FIG. 3 can, in an alternative embodiment, use a correction factor F of the prior art, i.e. which is energy dependent.

Turning back to FIG. 3, the corrected elemental yields are then submitted to an alpha filter circuit 36 (known per se) and the final data are input to recorder 11 linked to depth measuring device 13 recorder 11 linked to depth measuring device 13. A general description of an alpha filter can be found in U.S. Pat. Nos. 4,786,796 or 4,794,792 both to C. Flaum, J. E. Galford and S. V. Duckett, and which are both herein incorporated by reference.

Figure 4A:
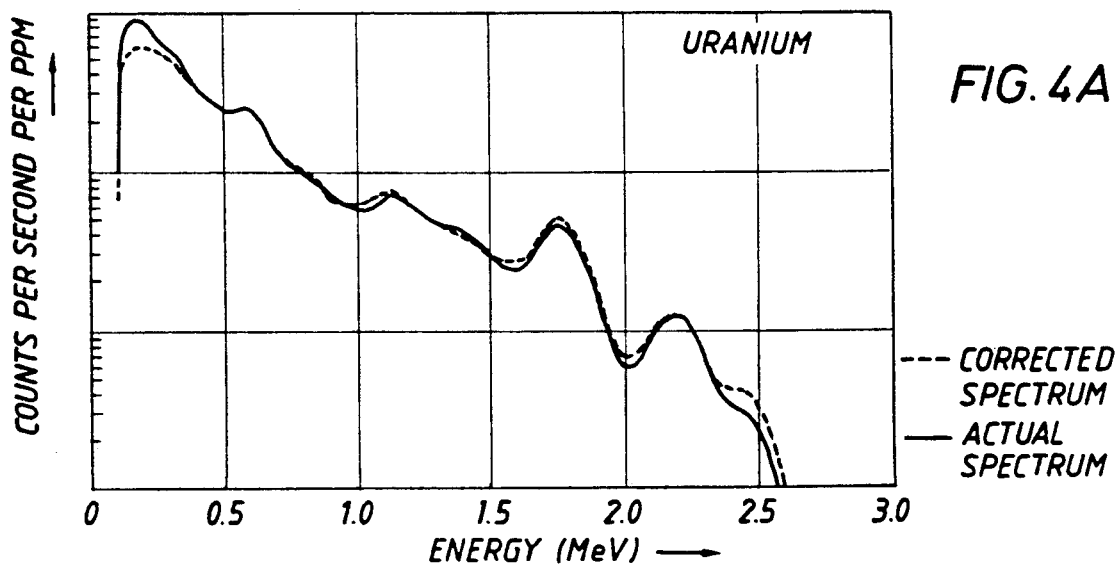
FIG. 4A shows for one radioactive element (uranium) respectively a corrected and an actual energy spectrum for the same borehole environment.
Figure 4B:
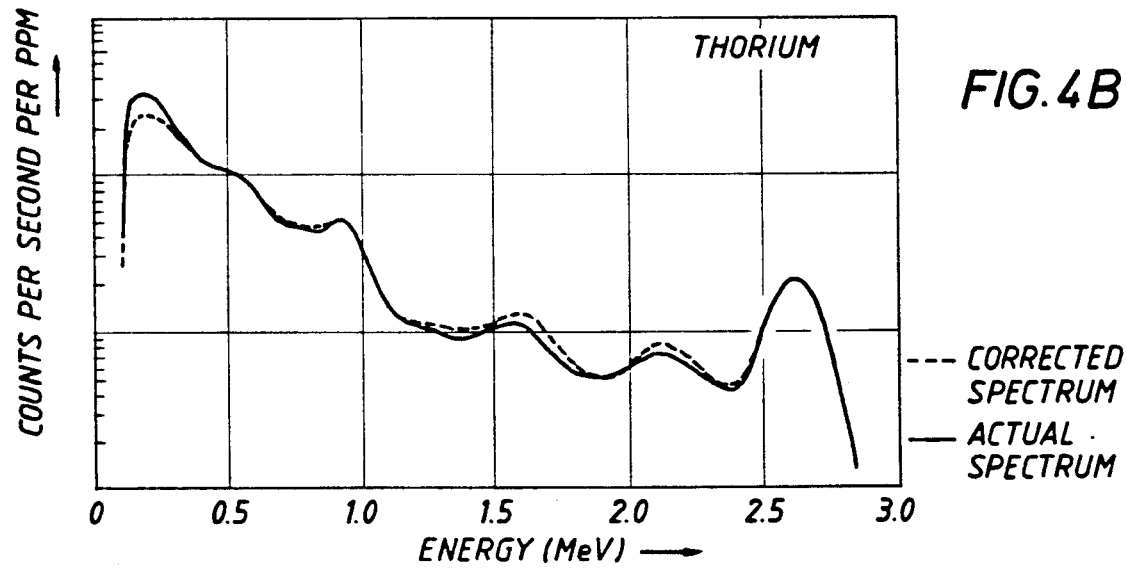
FIGS. 4B and 4C show energy spectra similar to those of FIG. 4A, respectively for thorium and potassium.
Figure 4C:
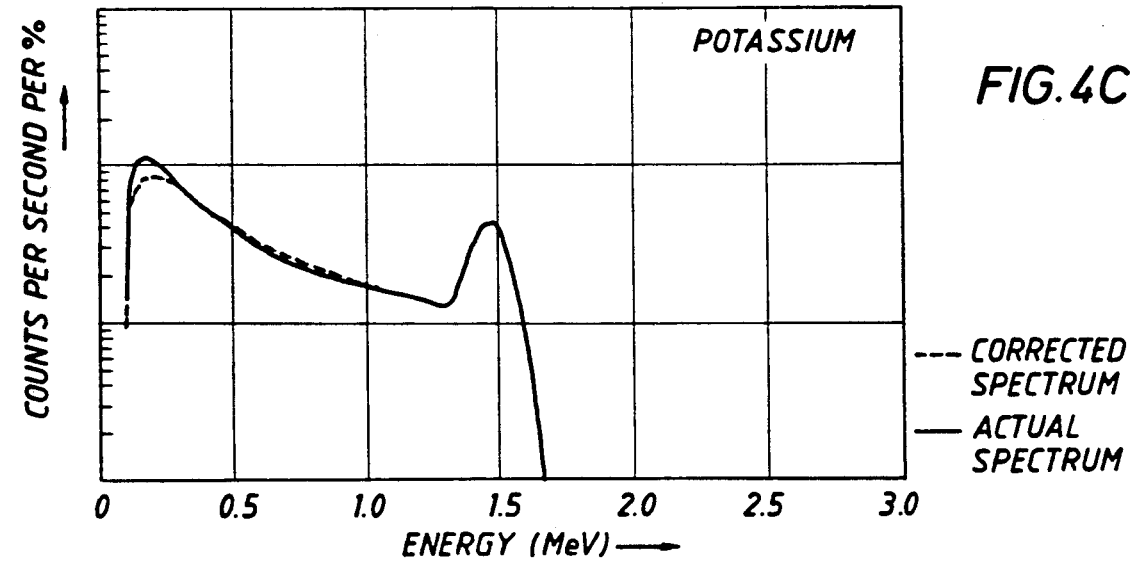

The benefit derived from the invention will be appreciated from the spectra shown on FIGS. 4A, 4B and 4C which each corresponds respectively to one element, uranium, thorium and potassium. The abscissa axis indicates counts per second per PPM or % and the ordinate axis indicates the energy in Mev. Each figure comprises two spectra: a first spectrum represented by a plain line and corresponding to a first actual spectrum measured in given borehole conditions, and a second spectrum represented by a dotted line corresponding to a second actual spectrum measured in borehole conditions which are different from the given conditions of first spectrum, the second spectrum having been corrected according to the method of the invention. One can see on each of the three FIGS. 4A, 4B and 4C the good match between both first and second spectra, in view of the error bars. However, the match is less satisfactory in the low energy region of the spectra, below a threshold energy around 0.4–0.5 Mev. This threshold is related to the photoelectric absorption of gamma rays in the mud.

FIG. 5 shows an alternative embodiment of the invention where elements similar to those on FIG. 3 bears the same reference. The example of FIG. 5 differs mainly from the one depicted on FIG. 3 in that the correction for borehole effect is carried out on the linear estimators L, i.e. before the yields are calculated, contrary to the example of FIG. 3 where the borehole correction is made directly on the yields Y. In the example of FIG. 5, the correction factor F is independent from the energy and from the naturally radioactive element as well. The correction factor F is calculated according to equation 12 in circuit 34 receiving the borehole parameters stored in memory 33. The valve F obtained is input in the linear estimator computation circuit 304 which generates linear estimators L already corrected for borehole effects. Thus the elemental yields Y issued from the yields calculation circuit 306 are borehole corrected.

What is claimed is:

1. A method for determining the presence of at least one naturally radioactive element in an earth formation surrounding a borehole, comprising the steps of:
   (1) detecting, at each depth in the borehole, the gamma rays emitted by the naturally radioactive element(s);
   (2) establishing, for each depth in the borehole, a spectrum (counts versus energy) of the gamma rays detected in a plurality of energy channels;
   (3) expressing, for each depth, the measured spectrum "U":

$$U = S Y$$

where "Y" is a vector whose components are the elemental yields and "S" is a composite spectra matrix made of individual standard spectra characteristic of a given borehole environment;
   (4) calculating a borehole correction factor from the general relationship between the borehole parameters, the individual standard spectra and the measured spectra; the correction factor being energy independent;
   (5) calculating borehole corrected standard spectra characteristic of the actual borehole environment by applying to the standard spectra the correction factor; and
   (6) calculating the elemental yields.

2. The method according to claim 1 wherein said correction factor is the same for all the energy channels above a given energy threshold.

3. The method according to claim 1 wherein said correction factor is the same for all the radioactive elements.

4. The method according to claim 1 wherein said standard spectra comprise one standard spectrum for each of three respective radioactive elements.

5. The method according to claim 4 wherein said elements comprises Th, U and K.

6. The method according to claim 1 wherein said correction factor "F" is of the form:

$$F = ae^{-bx} + c$$

where a, b and c are coefficients determined through a calibration process and "x" is a function of geometrical and physical parameters of the borehole.

7. The method according to claim 6 wherein x is of the form:

$$x = \tfrac{1}{2}(\phi_B - \phi_S)\rho_e$$

where $\phi_B$ is the borehole diameter, $\phi_S$ the tool diameter and $\rho_e$ is the density of electrons in the borehole fluid.

8. The method according to claim 7 wherein $\rho_c$ is given by:

$$\rho_e = a' + b'm$$

where "m" is the borehole fluid density and a' and b' are coefficients.

9. A method for determining the presence of at least one naturally radioactive element in an earth formation surrounding a borehole, comprising the steps of:
   (1) detecting, at each depth in the borehole, the gamma rays emitted by the naturally radioactive element(s);
   (2) establishing, for each depth in the borehole, a spectrum (counts versus energy) of the gamma rays detected in a plurality of energy channels;
   (3) expressing, for each depth, the measured spectrum "U":

$$U = S Y$$

where "Y" expresses the elemental yields and "S" is a composite spectra matrix made of individual standard spectra characteristic of a given borehole environment;
   (4) calculating from the measured spectra the elemental yields;
   (5) calculating a borehole correction factor from the general relationship between the borehole parameters, the standard spectra and the measured spectra; and
   (6) calculating borehole corrected yields by applying to the calculated yields the correction factor.

10. The method according to claim 9 wherein said correction factor is energy independent, for energies above a given threshold.

11. The method according to claim 9 wherein said correction factor is independent from the radioactive element.

12. The method according to claim 9 wherein said correction factor "F" is of the form:

$$F = ae^{-bx} + c$$

where a, b and c are coefficients determined through a calibration process and "x" is a function of geometrical and physical parameters of the borehole.

13. The method according to claim 12 wherein x is of the form:

$$x = \tfrac{1}{2}(\phi_B - \phi_S)\rho_e$$

where $\phi_B$ is the borehole diameter, $\phi_S$ the tool diameter and $\rho_e$ is the density of electrons in the borehole fluid.

14. The method according to claim 13 wherein $\rho_e$ is given by:

$$\rho_e = a' + b'm$$

where "m" is the borehole fluid density and a' and b' are coefficients.

15. An apparatus for determining the presence of at least one naturally radioactive element in an earth formation surrounding a borehole, comprising:
   (1) means for detecting, at each depth in the borehole, the gamma rays emitted by the naturally radioactive element(s);

(2) means for establishing, for each depth in the borehole, a spectrum (counts versus energy) of the gamma rays detected in a plurality of energy channels;

(3) means for expressing, for each depth, the measured spectrum "U":

$$U = S\,Y$$

where "Y" is a vector whose components are the elemental yields and "S" is a composite spectra matrix made of individual standard spectra characteristic of a given borehole environment;

(4) means for calculating a borehole correction factor from the general relationship between the borehole parameters, the individual standard spectra and the measured spectra; the correction factor being energy independent;

(5) means for calculating borehole corrected standard spectra characteristic of the actual borehole environment by applying to the standard spectra the correction factor; and (6) means for calculating the elemental yields.

16. The apparatus according to claim 15 wherein said correction factor is the same for all the energy channels above a given energy threshold.

17. The apparatus according to claim 15 wherein said correction factor is the same for all the radioactive elements.

18. The apparatus according to claim 15 wherein said standard spectra comprises three standard spectra for three respective elements.

19. The apparatus according to claim 18 wherein said elements comprises Th, U and K.

20. The apparatus according to claim 15 further comprising a sonde including at least one gamma ray detector.

21. The apparatus according to claim 20 wherein said detector comprises bismuth germanate crystal.

22. The apparatus according to claim 15 wherein said correction factor "F" is of the form:

$$F = a e^{-bx} + c$$

where a, b and c are coefficients determined through a calibration process and "x" is a function of geometrical and physical parameters of the borehole.

23. The method according to claim 22 wherein x is of the form:

$$x = \tfrac{1}{2}(\phi_B - \phi_S)\rho_e$$

where $\phi_B$ is the borehole diameter, $\phi_S$ the tool diameter and $\rho_e$ is the density of electrons in the borehole fluid.

24. The apparatus according to claim 23 wherein $\rho_e$ is given by:

$$\rho_e = a' + b'm$$

where "m" the borehole fluid density and a' and b' are coefficients.

25. An apparatus for determining the presence of at least one naturally radioactive element in an earth formation surrounding a borehole, comprising:

(1) means for detecting, at each depth in the borehole, the gamma rays emitted by the naturally radioactive element(s);

(2) means for establishing, for each depth in the borehole, a spectrum (counts versus energy) of the gamma rays detected in a plurality of energy channels;

(3) means expressing, for each depth, the measured spectrum "U":

$$U = S\,Y$$

where "Y" expresses the elemental yields and "S" is a composite spectra matrix made of individual standard spectra characteristic of a given borehole environment;

(4) means for calculating from the measured spectra the elemental yields;

(5) means for calculating a borehole correction factor from the general relationship between the borehole parameters, the standard spectra and the measured spectra; and (6) means for calculating borehole corrected yields by applying to the calculated yields the correction factor.

26. The apparatus according to claim 25 wherein said correction factor is energy independent, for most part of the energy spectra.

27. The apparatus according to claim 25 wherein said correction factor is independent from the radioactive element.

28. The apparatus according to claim 25 further comprising a sonde including at least one gamma ray detector.

29. The apparatus according to claim 28 wherein said detector comprises bismuth germanate crystal.

30. The apparatus according to claim 25 wherein said correction factor "F" is of the form:

$$F = a e^{-bx} + c$$

where a, b and c are coefficients determined through a calibration process and "x" is a function of geometrical and physical parameters of the borehole.

31. The method according to claim 30 wherein x is of the form:

$$x = \tfrac{1}{2}(\phi_B - \phi_S)\rho_e$$

where $\phi_B$ is the borehole diameter, $\phi_S$ the tool diameter and $\rho_e$ is the density of electrons in the borehole fluid.

32. The apparatus according to claim 31 wherein $\rho_e$ is given by:

$$\Sigma_e = a' + b'm$$

where "m" is the borehole fluid density and a' and b' are coefficients.

* * * * *